(12) United States Patent
Regan et al.

(10) Patent No.: US 9,258,236 B2
(45) Date of Patent: *Feb. 9, 2016

(54) PER-CLASS SCHEDULING WITH RATE LIMITING

(71) Applicant: Alcatel Lucent, Paris (FR)

(72) Inventors: Joseph M. Regan, Pleasanton, CA (US); Ron E. Haberman, Sunnyvale, CA (US); Mike Noll, Penn Valley, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/453,784

(22) Filed: Aug. 7, 2014

(65) Prior Publication Data

US 2015/0029857 A1   Jan. 29, 2015

Related U.S. Application Data

(63) Continuation of application No. 13/104,892, filed on May 10, 2011, now Pat. No. 8,854,967, which is a continuation of application No. 11/712,237, filed on Feb. 27, 2007, now Pat. No. 7,965,635.

(60) Provisional application No. 60/898,792, filed on Jan. 31, 2007.

(51) Int. Cl.
| *H04L 29/06* | (2006.01) |
| *H04L 12/28* | (2006.01) |
| *H04L 12/801* | (2013.01) |
| *H04L 12/819* | (2013.01) |
| *H04L 12/873* | (2013.01) |
| *H04L 12/24* | (2006.01) |
| *H04L 12/863* | (2013.01) |

(52) U.S. Cl.
CPC .............. *H04L 47/12* (2013.01); *H04L 41/083* (2013.01); *H04L 47/21* (2013.01); *H04L 47/522* (2013.01); *H04L 47/6215* (2013.01)

(58) Field of Classification Search
CPC ......... H04L 47/10; H04L 43/50; H04L 12/28; H04L 49/90; H04L 29/06
See application file for complete search history.

(56) References Cited

U.S. PATENT DOCUMENTS

| 7,457,313 | B2 * | 11/2008 | Patrick ......................... 370/468 |
| 7,492,776 | B2 * | 2/2009 | Saikusa et al. ................ 370/401 |
| 7,577,163 | B2 * | 8/2009 | Fang ............................. 370/468 |
| 7,609,631 | B2 * | 10/2009 | Stanwood et al. ............ 370/230 |
| 7,697,844 | B2 * | 4/2010 | Guo et al. ....................... 398/69 |
| 7,855,960 | B2 * | 12/2010 | Hinosugi et al. ........... 370/230.1 |
| 2002/0064150 | A1 * | 5/2002 | Pines et al. .................... 370/352 |

* cited by examiner

*Primary Examiner* — Andrew Lee
(74) *Attorney, Agent, or Firm* — Van Pelt, Yi & James LLP

(57) ABSTRACT

Providing network access is disclosed. Use of a provider equipment port via which network access is provided to two or more downstream nodes, each having one or more classes of network traffic associated with it, is scheduled on a per class basis, across the downstream nodes. The respective network traffic sent to each of at least a subset of the two or more downstream nodes is limited, on a per downstream node basis, to a corresponding rate determined at least in part by a capacity of a communication path associated with the downstream node.

20 Claims, 8 Drawing Sheets

PER-CLASS SCHEDULING WITH RATE LIMITING

CROSS REFERENCE TO OTHER APPLICATIONS

This application is a continuation of co-pending U.S. patent application Ser. No. 13/104,892, entitled PER-CLASS SCHEDULING WITH RATE LIMITING filed May 10, 2011 which is incorporated herein by reference for all purposes, which is a continuation of U.S. patent application Ser. No. 11/712,237, now U.S. Pat. No. 7,965,635, entitled PER-CLASS SCHEDULING WITH RATE LIMITING filed Feb. 27, 2007 and claims priority to U.S. Provisional Patent Application No. 60/898,792 entitled PER-CLASS SCHEDULING WITH RATE LIMITING, filed Jan. 31, 2007 which is incorporated herein by reference for all purposes.

BACKGROUND OF THE INVENTION

Under the typical approach, a fairness algorithm is used to allocate capacity among a plurality of intermediate devices such as multiple digital subscriber line access multiplexers (DSLAM), switches, or other access devices using a shared broadband network gateway port, a plurality of subscribers using the same DSLAM, etc., with service-based discrimination being implemented only at the subscriber level, e.g., as between applications or services within a subscriber context. However, it may in some cases be desirable to schedule on a per-service or class basis across subscribers and/or DSLAMs or other access devices.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Per class scheduling and rate limiting is disclosed. IN some embodiments, access to a shared port on a broadband network gateway (BNG) or other provider network gateway node is scheduled at the gateway on a per class basis. In some embodiments, a "leaky bucket" or similar structure is used to rate limit on a per subscriber and/or per DSLAM basis, e.g., to avoid sending via any path more traffic than that path can handle.

Figure 1:
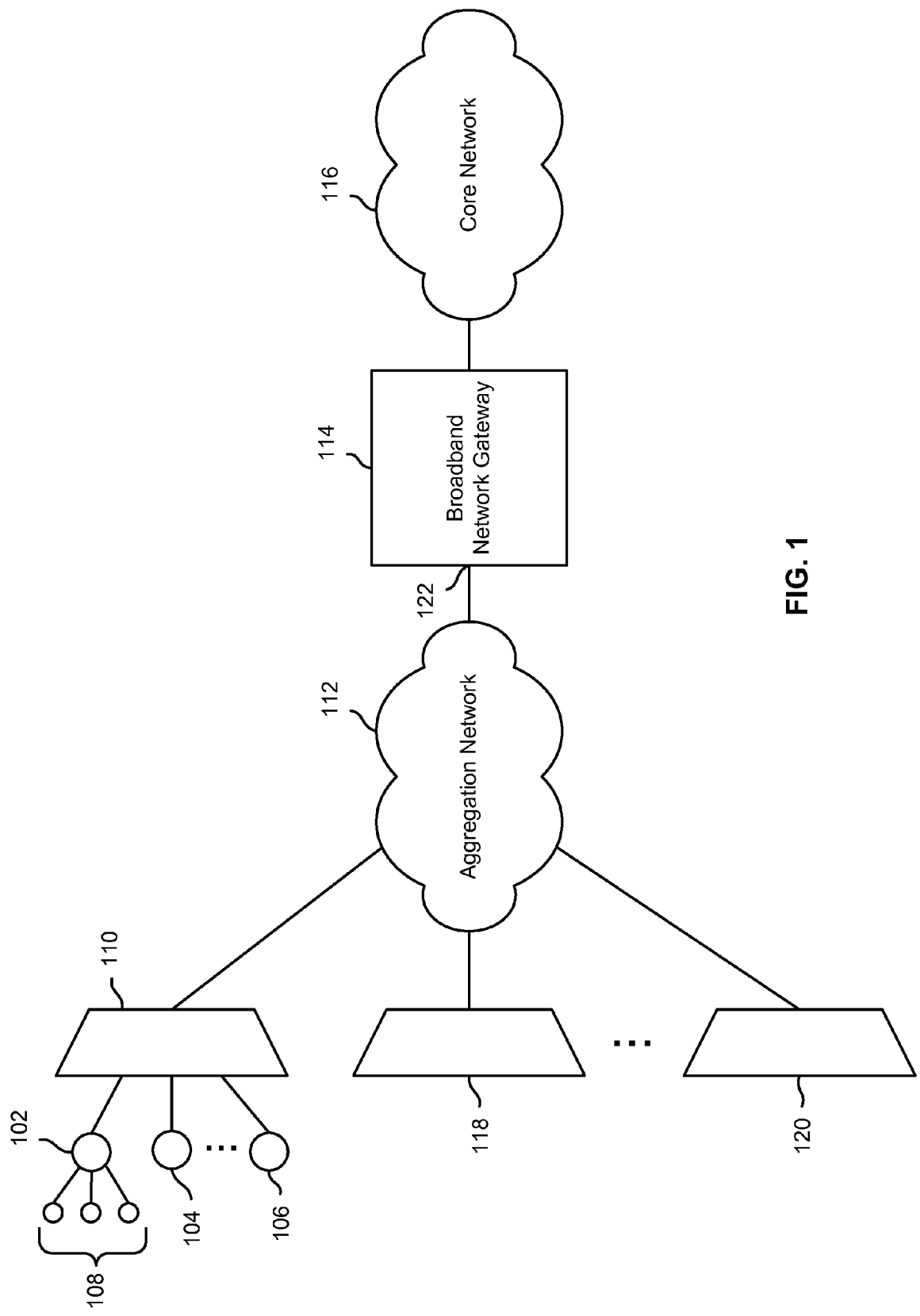
FIG. 1 is a block diagram illustrating an embodiment of a system for providing access to network services. I

FIG. 1 is a block diagram illustrating an embodiment of a system for providing access to network services. In the example shown, a plurality of subscriber hosts, represented in FIG. 1 by subscriber hosts 102, 104, and 106, access network services (represented in FIG. 1 by applications 108 associated with subscriber host 102; applications/services are used by other hosts but are not shown) via a digital subscriber line access multiplexer (DSLAM) 110, which has access via an aggregation network 112 and broadband network gateway (BNG) 114 to a core network 116. Examples of applications 108 include voice-over-IP (VoIP), streaming video, broadband Internet access (data), etc. In some embodiments, the applications 108 may include two or more different classes of the same type of service (e.g., high priority broadband Internet access and low priority broadband Internet access). Additional DSLAMs, represented in FIG. 1 by DSLAM 118 and DSLAM 120, and associated subscriber hosts (not shown) similarly have access to the core network 116 via aggregation network 112 and BNG 114.

In the example shown in FIG. 1, the various subscriber hosts and associated DSLAMs have access to the core network 116 via a shared port 122 at BNG 114. In a typical approach, a fairness algorithm (e.g., round robin) has been used to allocate the respective DSLAMs access to the shared port, e.g., transmitting and/or receiving a packet or n packets associated with a first DSLAM, then moving on to a next DSLAM, etc. Likewise, with respect to each DSLAM, a fairness algorithm realized at the DSLAM typically has been used to allocate access to the shared BNG port among subscribers and/or subscriber hosts. Under the typical approach, access is allocated on a per application, service, and/or class basis only at (i.e., within) each subscriber and/or subscriber host, for example to give preference to higher priority traffic when sending traffic from a subscriber host to the DSLAM.

While the access devices described in the above example and elsewhere here are DSLAMs, the techniques described herein apply as well to other types of access device.

Figure 2:
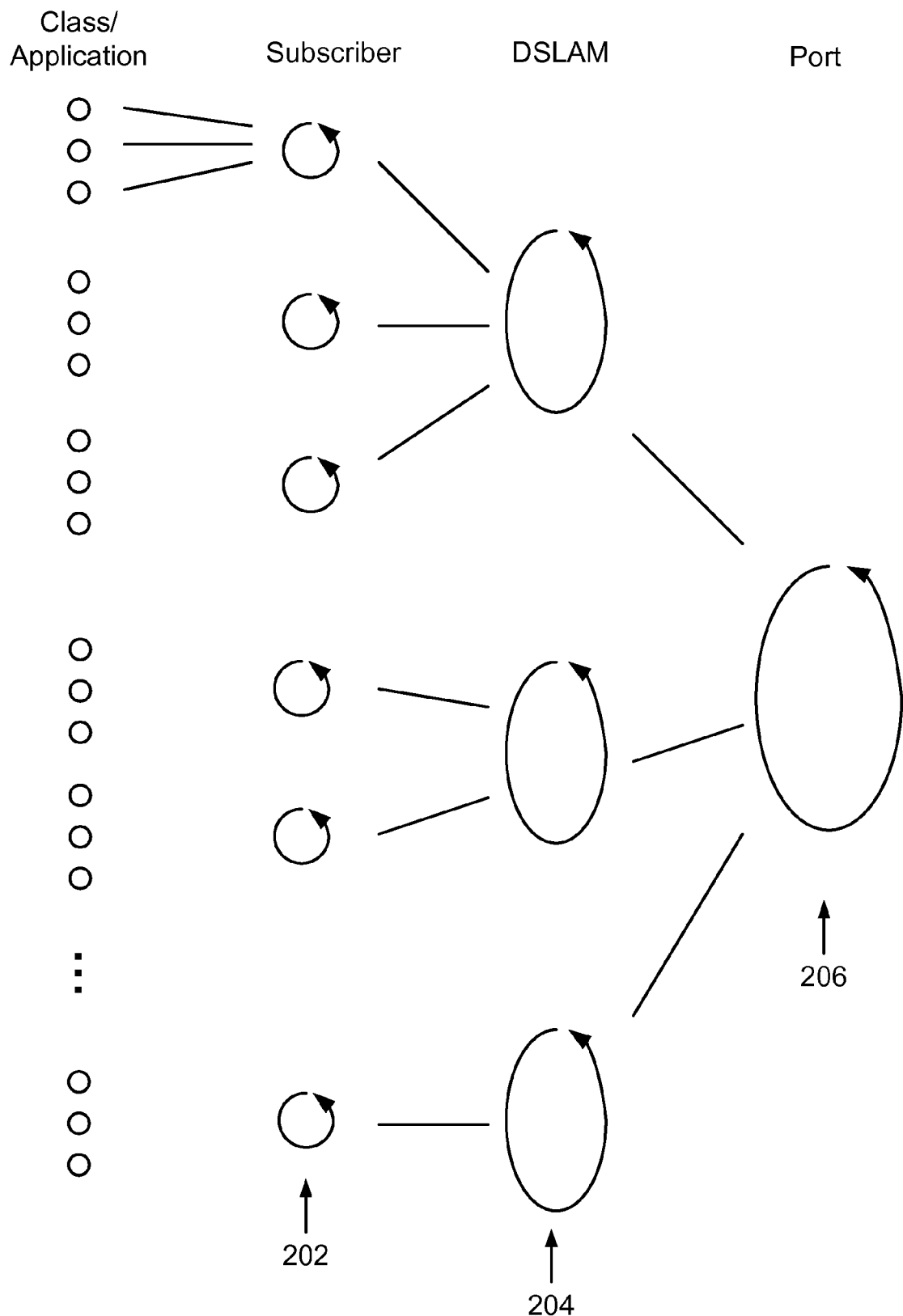
FIG. 2 is a block diagram illustrating an embodiment of a typical prior art approach to scheduling access to a shared BNG or other network gateway port.

FIG. 2 is a block diagram illustrating an embodiment of a typical prior art approach to scheduling access to a shared BNG or other network gateway port. In the example shown, each of a plurality of subscriber hosts uses an associated scheduling process (202) to schedule traffic among the applications, services, and/or classes of traffic associated with the subscriber host. At each DSLAM, an associated scheduling process (204) is used to schedule access among the subscriber hosts associated with the DSLAM. At the BNG, access to a port shared by multiple DSLAMs is allocated based on a scheduling process (206) at the BNG, e.g., a round robin or other fairness algorithm. Note that the prior art model illustrated by FIG. 2 does not provide for per class scheduling across subscriber hosts and/or at the BNG.

Figure 3:
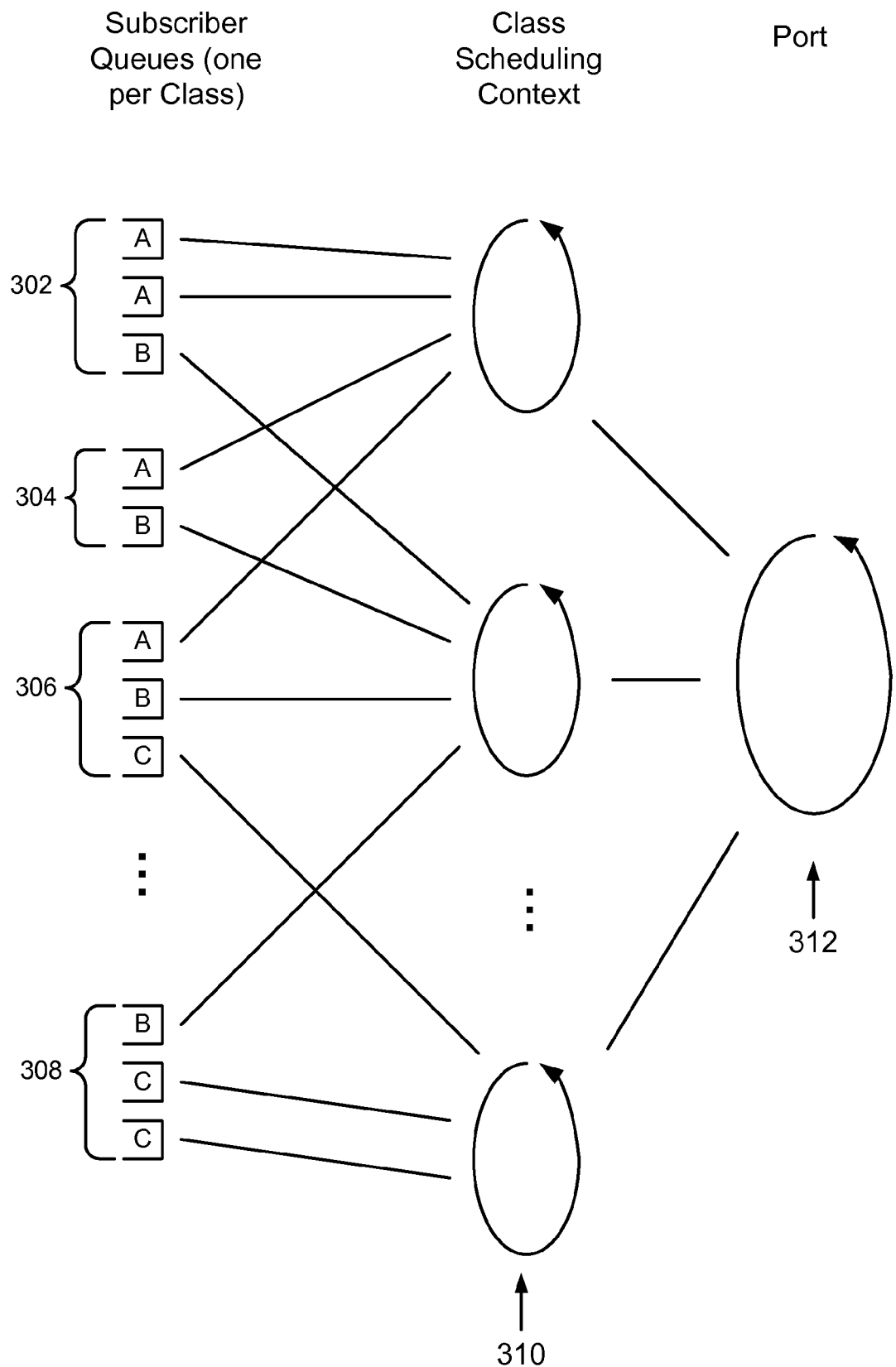
FIG. 3 is a block diagram illustrating an embodiment of a system for providing network services with per class scheduling.

FIG. 3 is a block diagram illustrating an embodiment of a system for providing network services with per class scheduling. In the example shown, a plurality of subscribers, represented in FIG. 3 by subscriber queues 302, 304, 306, and 308 each access one or more network services (e.g., applications), each service being associated with one of three classes or levels of service, represented in FIG. 3 by the letters "A", "B", and "C". Access to a shared BNG (or other) port is scheduled within each class, across subscribers, by a corresponding one of a plurality of per class scheduling processes 310. In some embodiments, the per class scheduling processes are realized at a BNG or other node through which access is being provided. A port scheduling process 312 is used to allocate access to the shared port as between the respective classes of traffic. For example, in some embodiments a round robin or other fairness algorithm is used to schedule access among subscribers and/or applications within a class, and access to the port is allocated to the respective classes of traffic by the port scheduling process, which may allocate access evenly (e.g., round robin) or may favor some classes of traffic over others (e.g., weighted round robin), depending on the nature of the different classes of traffic being scheduled.

Referring further to FIG. 1, in a typical implementation the connection between the BNG 114 and the aggregation network 112 will be much faster (higher bandwidth, e.g., on the order of 10 Gbps) than the connection between the aggregation network 112 and the DSLAMs 110, 118, and 120 (e.g., 1 Gbps), which in turn have higher bandwidth than the connections from the DSLAMs to the subscriber hosts (e.g., 20 Mbps). In some embodiments, to avoid congesting the lower capacity downstream segments, and to avoid using port capacity to send via a particular path more traffic than that path can handle, rate limiting is applied at the BNG on a per DSLAM and/or per subscriber host basis.

Figure 4:
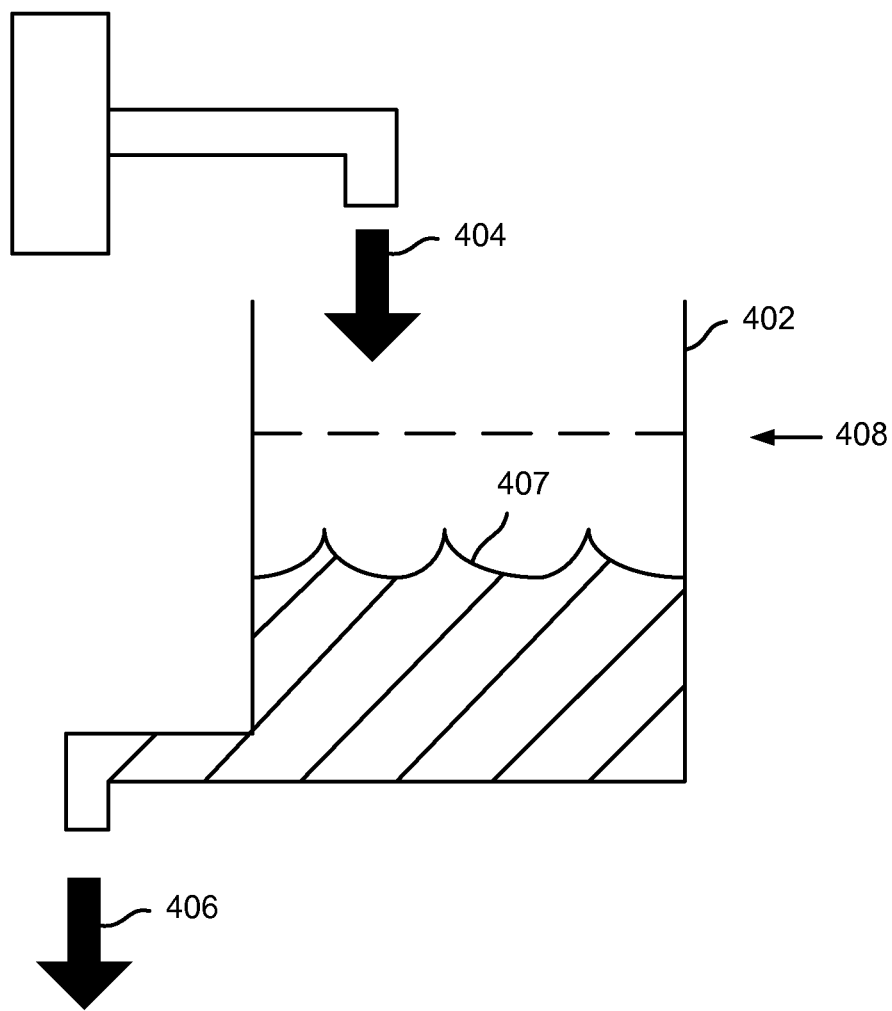
FIG. 4 is a schematic (conceptual) representation of an embodiment of a system for rate limiting.

FIG. 4 is a schematic (conceptual) representation of an embodiment of a system for rate limiting. In the example shown, a so-called "leaky bucket" 402 is configured to ensure that no more data than a path can handle is sent down that path. For each packet sent to a DSLAM and/or subscriber host with which the leaky bucket 402, an amount determined at least in part by the size of the packet is added to the leaky bucket 402, as indicated in FIG. 4 by the arrow 404. Periodically (or continuously or nearly so), an amount determined at least in part by a bandwidth or other capacity of a communication path with which the leaky bucket 402 is associated is removed from the leaky bucket (i.e., "leaks" out), as indicated in FIG. 4 by arrow 406. A level 407 of the leaky bucket is monitored and sending of packets associated with the leaky bucket 402 is placed on hold if the level 407 exceeds an established threshold (maximum) level 408. In some embodiments, the structure represented conceptually in FIG. 4 by leaky bucket 402 is implemented using a counter or other well known computing structure. For example, each time a packet is sent, a counter is incremented by an amount determined at least in part by the size of the packet. Periodically the counter is decremented by an amount determined at least in part by a capacity of a communication path with which the counter is associated (e.g., 1 Gbps in the case of a counter used to rate limit on a per DSLAM basis or 20 Mbps in the case of a counter used to rate limit on a per subscriber host basis, in the example described above).

Figure 5:
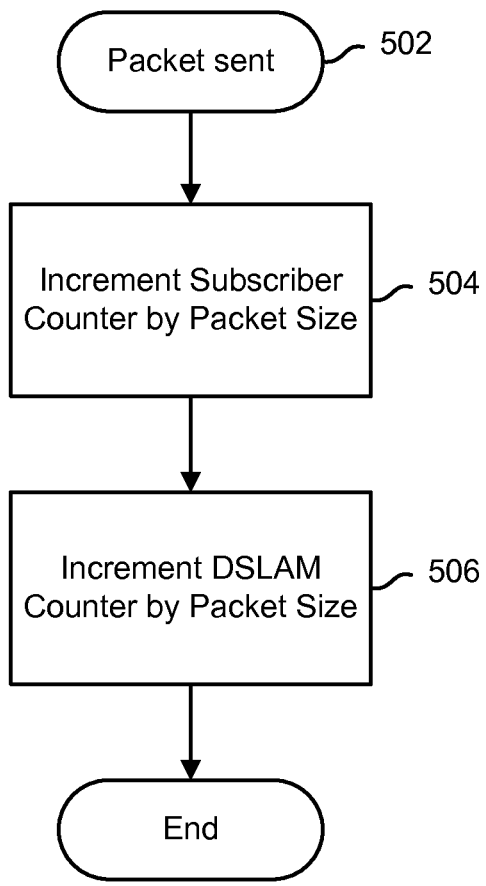
FIG. 5 is a flow chart illustrating an embodiment of a process for rate limiting on a per subscriber and per DSLAM basis.

FIG. 5 is a flow chart illustrating an embodiment of a process for rate limiting on a per subscriber and per DSLAM basis. In the example shown, a packet is sent (502). A subscriber counter associated with a subscriber with which the sent packet is associated is incremented by an amount determined at least in part by the size of the sent packet (504). A DSLAM counter associated with a DSLAM with which the sent packet is associated is incremented by an amount determined at least in part by the size of the sent packet (506). In some embodiments, an iteration of the process of FIG. 5 is performed each time a packet that is associated with rate limiting is sent.

Figure 6:
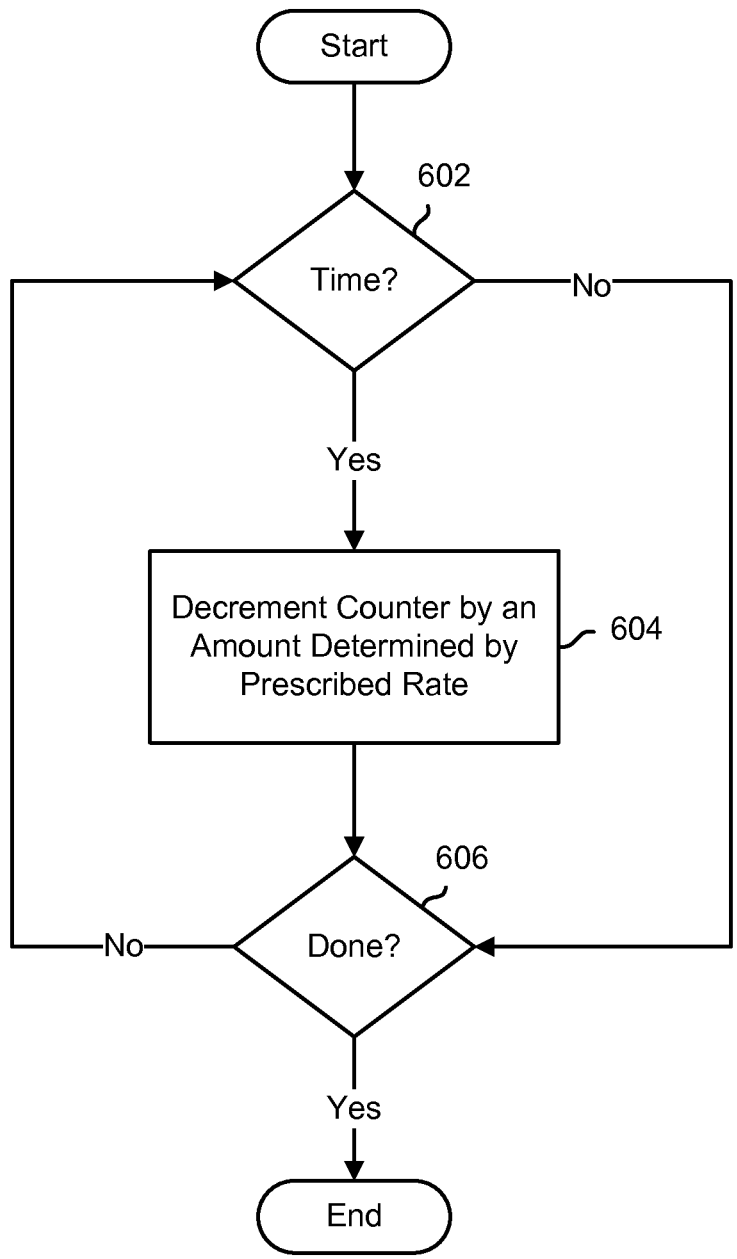
FIG. 6 is a flow chart illustrating an embodiment of a process for rate limiting.

FIG. 6 is a flow chart illustrating an embodiment of a process for rate limiting. In the example shown, at a prescribed time (602), e.g., periodically and/or nearly continuously, a counter being used to rate limit is decremented by an amount determined at least in part by a prescribed rate associated with the counter (604), e.g., a rate determined at least in part by a capacity of a communication path with which the counter is associated. The counter is decremented periodically (or nearly continuously) unless or until an indication is received that rate limiting is no longer to be performed (606).

Figure 7:
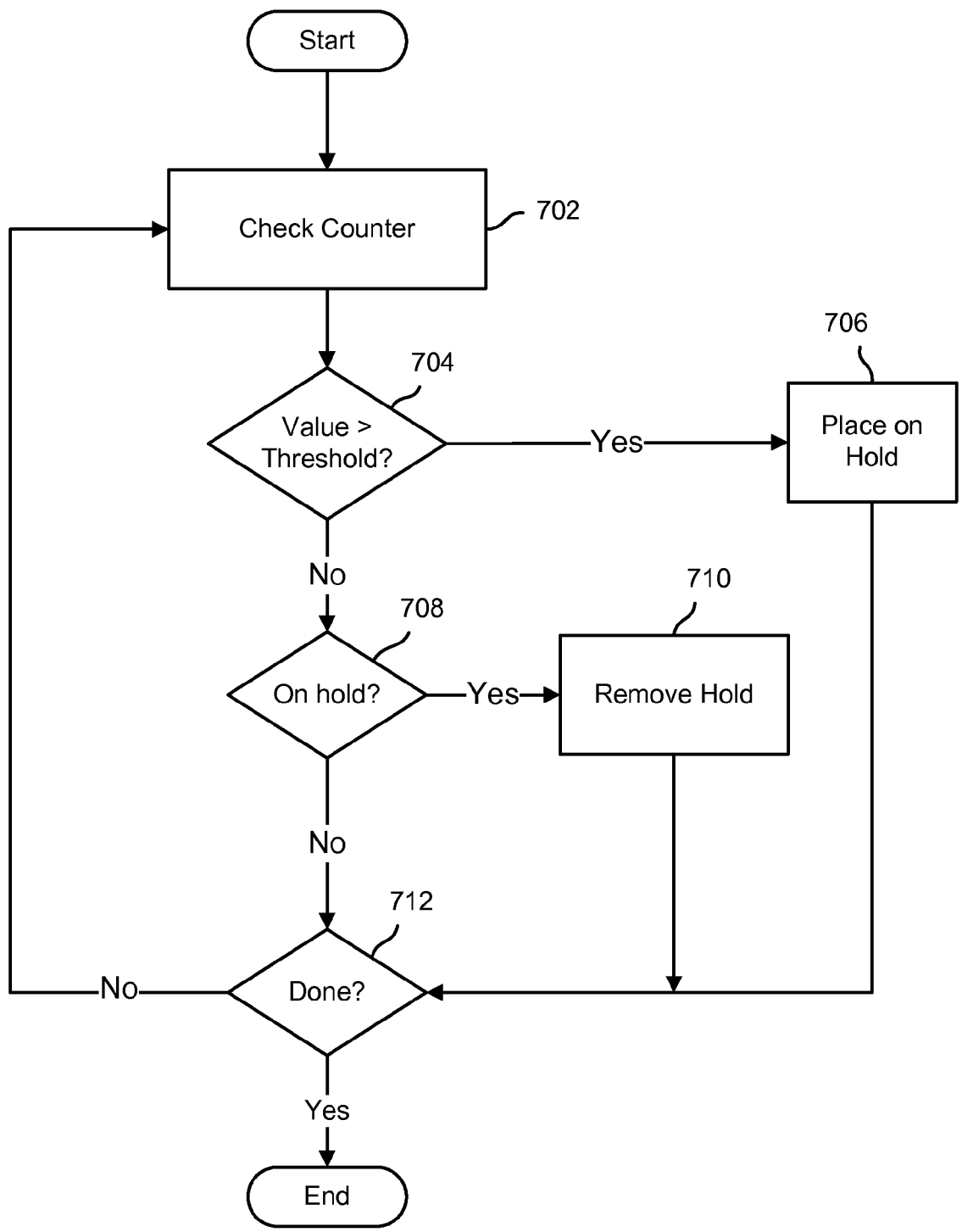
FIG. 7 is a flow chart illustrating an embodiment of a process for rate limiting.

FIG. 7 is a flow chart illustrating an embodiment of a process for rate limiting. In the example shown, a counter being used to rate limit is checked (702), e.g., at prescribed intervals, just after a packet is sent, and/or at or just before a time when a subscriber host and/or DSLAM with which the counter is associated is scheduled or expected to have an opportunity to transmit. If the counter value (level) exceeds a prescribed threshold (704), an associated queue (e.g., in the case of a counter being used to rate limit with respect to a subscriber and/or subscriber host) or set of queues (e.g., the queues associated with subscriber hosts associated with a particular DSLAM, in the case of a counter being used to rate limit with respect to a DSLAM) is/are placed on "hold" (706), i.e., sending of packets associated with the queue(s) is/are suspended and the queue(s) is/are not considered as being available to be selected for transmission by an associated scheduling process, such as a per class scheduling process running at a BNG or other access node. If the level does not exceed the threshold (704), it is determined whether the associated queue(s) is/are in a "hold" status (708). If so, the hold is removed (710). If not (708), or after any hold has been removed (710), the counter is checked again (702), e.g., at the next interval, and successive iterations of the process are repeated until the process ends (712).

Figure 8:
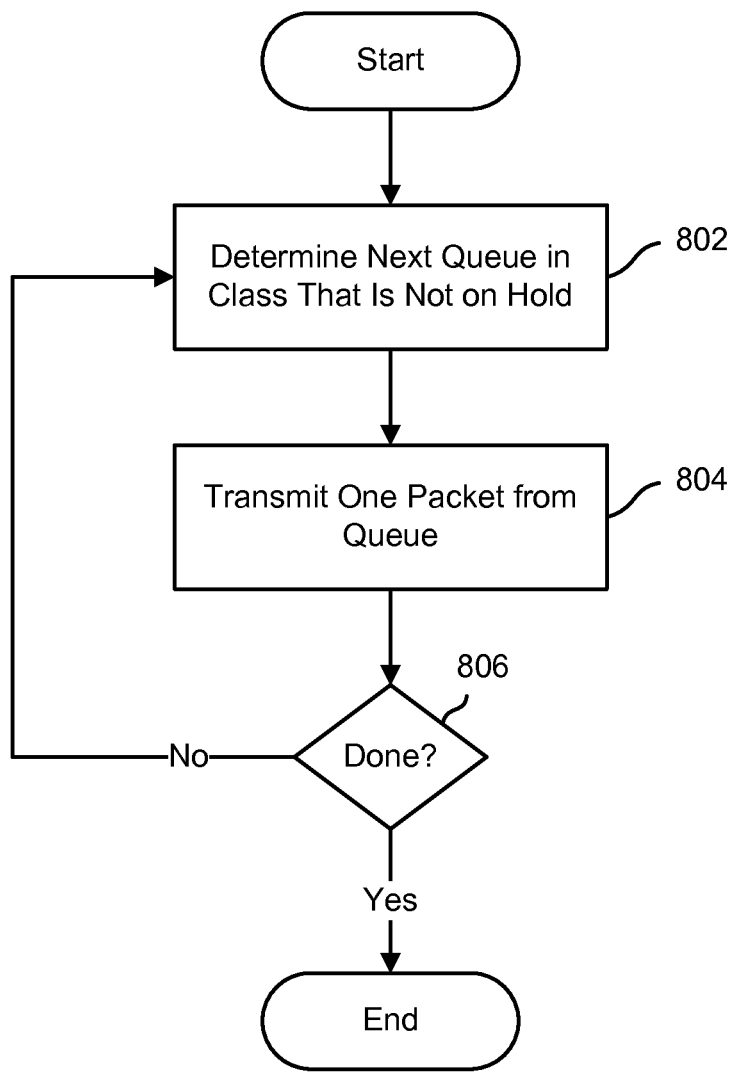
FIG. 8 is a flow chart illustrating an embodiment of a process for per class scheduling with rate limiting.

FIG. 8 is a flow chart illustrating an embodiment of a process for per class scheduling with rate limiting. In some embodiments, each of the per class scheduling contexts 310 of FIG. 3 includes the process of FIG. 8. In the example shown, a next queue that is not on hold is determined (e.g., selected) from among the queues within the class (802). In some embodiments, a round robin or other fairness algorithm is used, with queues that have been placed in a "hold" status being skipped over. A packet associated with the determined (selected) queue is transmitted (804). Successive next queues are selected (802) and associated packets transmitted (804) until the process ends (806).

The techniques disclosed herein enable scheduling to be performed at a BNG or similar node on a per class basis, across multiple subscribers. The rate limiting techniques described herein enable a BNG or similar node configured to schedule traffic on a per class basis to avoid overrunning lower capacity communication paths downstream, which avoids congestion and using scarce BNG port capacity to send via a communication path more traffic than the path can accommodate.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for providing network access, comprising:
 a communication port configured to send network traffic to and receive network traffic from each of two or more downstream nodes, each having one or more classes of network traffic associated with it; and
 a processor coupled to the communication interface and configured to:
  schedule on a per class basis, across downstream nodes, use of a provider equipment port via which access to a core provider network is provided to said two or more downstream nodes via said communication port; and
  limit the respective network traffic sent to each of at least a subset of the two or more downstream nodes, on a per downstream node basis, to a corresponding rate determined at least in part by a capacity of a communication path associated with the downstream node.

2. The system as recited in claim 1, wherein the downstream nodes comprise subscriber hosts.

3. The system as recited in claim 1, wherein the downstream nodes comprise digital subscriber line access multiplexers (DSLAM).

4. The system as recited in claim 1, wherein the downstream nodes comprise access nodes, each of which has associated with it one or more subscriber hosts each of which receives directly from said access node one or more of said one or more classes of network traffic.

5. The system as recited in claim 1, wherein said downstream nodes comprise a first level of nodes configured to provide access to a second level of nodes comprising a plurality of subscriber hosts, each associated with at least one of said first level nodes and each configured to receive via said first level node one or more of said one or more classes of network traffic.

6. The system as recited in claim 5, wherein limiting includes applying to each of at least a subset of said first level nodes a corresponding first aggregate rate limit on traffic sent to that first level node, across subscriber hosts.

7. The system as recited in claim 6, wherein limiting further includes applying to each of at least a subset of said subscriber hosts a corresponding second rate limit on traffic sent to that subscriber host.

8. The system as recited in claim 1, wherein limiting to a corresponding rate includes configuring a counter or other leaky bucket mechanism to be incremented in proportion to the size of each packet sent to the downstream node and to be decremented at a rate based at least in part on said corresponding rate.

9. The system as recited in claim 1, wherein scheduling on a per class basis includes providing for each of said one or more classes of network traffic a corresponding scheduling process.

10. The system as recited in claim 1, wherein the processor is further configured to schedule use of said provider equipment port as between said one or more class of network traffic.

11. The system as recited in claim 10, wherein scheduling use of said provider equipment port as between said one or more class of network traffic is performed using a fairness algorithm that ensures equal or nearly equal access is provided for each of said one or more classes of network traffic.

12. The system as recited in claim 10, wherein scheduling use of said provider equipment port as between said one or more class of network traffic is performed using an algorithm that affords one or more higher priority classes of network traffic greater access to the provider equipment port than one or more lower priority classes of network traffic.

13. The system as recited in claim 1, wherein said provider equipment comprises a broadband network gateway (BNG).

14. The system as recited in claim 1, wherein scheduling on a per class basis includes determining a next subscriber queue.

15. The system as recited in claim 1, wherein at least one of said downstream nodes comprises a DSLAM and said communication path comprises a link between said DSLAM and an aggregation network via which the DSLAM is connected to the provider network gateway device.

16. The system as recited in claim 1, wherein at least one of said downstream nodes comprises a subscriber host and said communication path comprises a link between said subscriber host and a DSLAM via which the subscriber host has connectivity to the provider network gateway device.

17. The system as recited in claim 1, wherein the processor is configured to limit the respective network traffic sent to each of at least a subset of the two or more downstream nodes, on a per downstream node basis, to the corresponding rate at least in part by configuring for each downstream node for which such rate limiting is performed a counter or other leaky bucket mechanism configured to ensure that said corresponding rate is not exceeded.

18. The system as recited in claim 1, further comprising a second communication port via which access to said core provider network is available to said provider network gateway device.

19. A method of providing network access, comprising:
 scheduling on a per class basis, across downstream nodes, use of a provider equipment port via which network access is provided to two or more downstream nodes, each having one or more classes of network traffic associated with it; and
 using a processor to limit the respective network traffic sent to each of at least a subset of the two or more downstream nodes, on a per downstream node basis, to a corresponding rate determined at least in part by a capacity of a communication path associated with the downstream node.

20. A computer program product for providing network access, the computer program product being embodied in a non-transitory computer readable medium and comprising computer instructions for:
 scheduling on a per class basis, across downstream nodes, use of a provider equipment port via which network access is provided to two or more downstream nodes, each having one or more classes of network traffic associated with it; and
 limiting the respective network traffic sent to each of at least a subset of the two or more downstream nodes, on a per downstream node basis, to a corresponding rate determined at least in part by a capacity of a communication path associated with the downstream node.

* * * * *